US011072046B2

(12) United States Patent
Matsuoka et al.

(10) Patent No.: US 11,072,046 B2
(45) Date of Patent: Jul. 27, 2021

(54) INSPECTION SYSTEM

(71) Applicants: TOYOTA JIDOSHA KABUSHIKI KAISHA, Toyota (JP); ATLAS COPCO KK, Tokyo (JP)

(72) Inventors: Jun Matsuoka, Toyota-ken (JP); Aki Awata, Aichi-ken (JP); Anders Rudin, Stockholm (SE)

(73) Assignees: TOYOTA JIDOSHA KABUSHIKI KAISHA, Toyota (JP); ATLAS COPCO KK, Tokyo (JP)

( * ) Notice: Subject to any disclaimer, the term of this patent is extended or adjusted under 35 U.S.C. 154(b) by 111 days.

(21) Appl. No.: 16/454,577

(22) Filed: Jun. 27, 2019

(65) Prior Publication Data
US 2020/0009696 A1 Jan. 9, 2020

(30) Foreign Application Priority Data

Jul. 3, 2018 (JP) .............................. JP2018-126652

(51) Int. Cl.
*B25B 23/14* (2006.01)
*B23P 19/06* (2006.01)
*G01L 25/00* (2006.01)

(52) U.S. Cl.
CPC ............ *B23P 19/066* (2013.01); *B25B 23/14* (2013.01); *G01L 25/003* (2013.01)

(58) Field of Classification Search
CPC . B23P 19/066; B23P 19/065; Y10T 29/49766
See application file for complete search history.

(56) References Cited

U.S. PATENT DOCUMENTS

| 5,502,883 A | * | 4/1996 | Ohmi | .................... B25B 21/002 29/407.02 |
| 5,650,574 A | * | 7/1997 | Sato | ...................... B23P 19/066 73/862.23 |
| 2003/0065474 A1 | * | 4/2003 | McGee | .................. B25B 23/14 702/151 |
| 2004/0172800 A1 | * | 9/2004 | Seith | ...................... B25B 21/00 29/407.01 |

FOREIGN PATENT DOCUMENTS

| JP | 07-290370 A | 11/1995 |
| JP | 2009-255241 A | 11/2009 |
| JP | 2017-030072 A | 2/2017 |
| JP | 2017-193052 A | 10/2017 |

\* cited by examiner

*Primary Examiner* — Jason L Vaughan
*Assistant Examiner* — Amanda Kreiling
(74) *Attorney, Agent, or Firm* — Sughrue Mion, PLLC (57) ABSTRACT

An inspection system is provided, which is capable of notifying a worker of a determination result immediately while preventing detection failure. The inspection system to inspect a tightening state of a bolt includes: a server device that determines quality of the tightening state of the bolt based on a degree of similarity of a shape of a tightening waveform that indicates a torque change with time when a worker tightens the bolt using a nutrunner to a shape of a reference waveform that indicates an ideal torque change with time when the bolt is tightened; and a notification device that notifies the worker of the quality of the tightening state of the bolt, which is determined by the server device.

5 Claims, 4 Drawing Sheets

INSPECTION SYSTEM

CROSS-REFERENCE TO RELATED APPLICATIONS

The present application claims priority under 35 U.S.C. § 119(a) to Japanese Patent Application No. 2018-126652, filed on Jul. 3, 2018. The contents of this application are incorporated herein by reference in its entirety.

TECHNICAL FIELD

The present invention relates to an inspection system.

BACKGROUND ART

Conventionally, an inspection system to inspect a screw tightening state is known (for example, see Patent Document 1).

The inspection system disclosed in Patent Document 1 includes: a tightening machine that tightens a bolt; and an external device connected to the tightening machine. The external device stores T-θ waveform data that indicates the relation between torque and a rotation angle when the bolt is tightened. The tightening machine is configured to extract consecutively the torque and the rotation angle when the bolt is tightened, and to output T-θ actual tightening curve to the external device. The external device is configured to determine whether the tightening is normally performed or not by comparing an inclination change point of the T-θ waveform data and an inclination change point of the T-θ actual tightening curve.

PRIOR ART DOCUMENT

Patent Document

Patent Document 1: JP 2017-030072 A

SUMMARY OF THE INVENTION

Problem to be Solved by the Invention

However, in the case where the quality of the bolt tightening state is determined according to final results (i.e. torque and angle) when the tightening is completed, as indicated in the conventional inspection system, detection failure may occur (specifically, a defective state may be falsely determined to be a good state). That is, even when the final results at the time of completion of tightening fall within the range of normal conditions, screw threads may be damaged. For example, there may be a case in which the bolt is inserted obliquely and the existing threads are damaged while the bolt is tightened with threads newly formed as the bolt is inserted. In this case, the defective state may be overlooked.

Here, if a worker visually confirms the shape of the tightening waveform that indicates a torque change with time when the bolt is tightened, the tightening quality can be appropriately determined. However, it is difficult for the worker to visually confirm instantly the respective shapes of the tightening waveforms with respect to all the bolt tightening points on the production line.

The present invention was made in consideration of the above problem, an object of which is to provide an inspection system capable of notifying a worker of determination result immediately while preventing detection failure.

Means for Solving the Problem

An inspection system of the present invention is to inspect a tightening state of a screw. The inspection system includes: a determination device configured to determine quality of the tightening state of the screw based on a degree of similarity of a shape of a tightening waveform that indicates a torque change with time when a worker tightens the screw using a tightening tool to a shape of a reference waveform that indicates an ideal torque change with time when the screw is tightened; and a notification device configured to notify the worker of the quality of the tightening state of the screw, which is determined by the determination device.

With the above-described configuration, the quality of the tightening state of the screw is determined based on the degree of similarity of the shape of the tightening waveform to the shape of the reference waveform. Thus, it is possible to prevent detection failure. Also, since the notification device is provided, it is possible to immediately notify the worker of the determination result by the determination device.

In the above-described inspection system, the reference waveform may be calculated based on a plurality of past tightening waveforms. The plurality of past tightening waveforms may be classified into a plurality of groups based on the degree of similarity, and out of the plurality of groups, a group to which the largest number of the past tightening waveforms belong may be defined as a normal group so as to define the reference waveform as an average value of the past tightening waveforms that belong to the normal group.

With the above-described configuration, since the tightening waveforms of the normal group are highly probable to be the tightening waveforms of the normal products, it is possible to calculate the accurate reference waveform.

In the above-described inspection system, the determination device may be configured to calculate a plurality of feature values with respect to similarity between the shape of the reference waveform and the shape of the tightening waveform so as to determine the quality of the tightening state of the screw based on the plurality of feature values.

With the above-described configuration, it is possible to quantify the similarity between the shape of the reference waveform and the shape of the tightening waveform so as to perform quality determination. More specifically, since the similarity between the shape of the reference waveform and the shape of the tightening waveform can be quantified as a plurality of feature values, it is possible to perform quality determination using the plurality of feature values.

In the above-described inspection system, the determination device may include a database that accumulates the tightening waveforms, and the determination device may be configured to delete, out of the tightening waveforms accumulated in the database, the tightening waveforms that are determined to be normal.

With the above-described configuration, it is possible to prevent increase in the data amount of the tightening waveforms accumulated in the database.

In the above-described inspection system, the notification device may be configured to be receivable of input by the worker with respect to the worker's determination of the quality of the tightening state of the screw.

With the above-described configuration, even when it is determined by the determination device that the tightening state is defective, if the worker confirms the state and determines that it is normal, it is possible to correct the determination result of the determination device.

In the above-described inspection system, the determination device may be configured to determine the quality of the tightening state of the screw based on the degree of similarity of the shape of the tightening waveform that indicates a rotation angle change with time when the worker tightens the screw using the tightening tool to the shape of the reference waveform that indicates an ideal rotation angle change with time when the screw is tightened.

With the above-described configuration, the quality of the tightening state of the screw is determined based on the degree of similarity of the shape of the tightening waveform to the shape of the reference waveform with respect to the rotation angle of the screw. Thus, it is possible to further prevent detection failure.

Advantageous Effect of the Invention

With the inspection system of the present invention, it is possible to immediately notify the worker of the determination result while preventing detection failure.

DESCRIPTION OF EMBODIMENT

Hereinafter, an embodiment of the present invention will be described with reference to the drawings.

First, the configuration of an inspection system 100 according to an embodiment of the present invention is described with reference to FIGS. 1 and 2.

The inspection system 100 is installed, for example, on a production line of a vehicle, and configured to inspect the tightening state of a bolt (not shown). As shown in FIG. 1, this inspection system 100 includes: a nutrunner 1; a server device 2; and a notification device 3. In FIG. 1, a pair of nutrunner 1 and notification device 3 is only shown, however, a number of nutrunners 1 and notification devices 3 are installed on the actual production line. The inspection system 100 is configured, for example, to inspect all the bolt tightening points on the production line. Hereinafter, a certain pair of nutrunner 1 and notification device 3 is described, out of the multiple nutrunners 1 and notification devices 3. Also, the bolt is an example of a "screw" of the present invention.

The nutrunner 1 is used when a worker tightens a bolt, and arranged in a predetermined process on the production line. The nutrunner 1 includes: a nutrunner body 11; and a controller 12 that controls the nutrunner body 11. The nutrunner 1 is an example of a "tightening tool" of the present invention.

The nutrunner body 11 includes: a socket (not shown) with which the bolt head is engaged; and a motor 111 that rotates the socket. The nutrunner body 11 is configured to rotate the bolt by the motor 111 so as to tighten the bolt. The nutrunner body 11 also includes a torque sensor 112 that detects torque when the bolt is tightened; and a rotation angle sensor 113 that detects a rotation angle when the bolt is tightened.

The controller 12 is connected to the nutrunner body 11 so as to control the motor 111. The controller 12 can tighten the bolt in various tightening manners. In the controller 12, a tightening manner is set in which tightening and stop of the tightening are consecutively performed three times for the period from the start of the tightening to the completion of the tightening.

To the controller 12, detection results from the torque sensor 112 when the bolt is tightened are consequently input. According to the detection results, the controller 12 generates a tightening waveform (time-series data) that indicates a change (transition) in the torque with time. Similarly to the above, to the controller 12, detection results from the rotation angle sensor 113 when the bolt is tightened are consequently input. According to the detection results, the controller 12 generates a tightening waveform that indicates a change in the rotation angle with time. When the bolt is tightened with the nutrunner body 11, the controller 12 transmits, to the server device 2, the tightening waveform of the torque and the tightening waveform of the rotation angle. In addition, when the controller 12 transmits the tightening waveforms to the server device 2, it also transmits identification information of the nutrunner 1 and a date and time of tightening, together with the tightening waveforms.

The server device 2 is configured to determine the quality of the tightening state of the bolt based on the tightening waveform of the torque transmitted from the nutrunner 1. Specifically, the server device 2 is configured to determine the quality of the tightening state based on the degree of similarity of the shape of the tightening waveform to the shape of the reference waveform. Here, the reference waveform (see FIG. 2) indicates an ideal torque change with time during tightening the bolt using the nutrunner 1, and the calculation method thereof will be described later. That is, the server device 2 performs quality determination by quantifying similarity between the shape of the reference waveform and the shape of the tightening waveform, which leads to prevention of the detection failure. The server device 2 is an example of a "determination device" of the present invention.

Also, the server device 2 is configured to transmit the determination result of the tightening state of the bolt to the notification device 3. For example, the server device 2 determines whether it is necessary to alert the worker, and when it determines that the alert is necessary, it transmits the determination result to the notification device 3.

The server device 2 includes, for example: a control unit 21; a waveform database 22; and a communication unit 23. The control unit 21 includes a CPU, a ROM and a RAM, and is configured to control the server device 2. The control unit 21 stores, in advance, the above-described reference waveform together with the identification information of the nutrunner 1. In other words, the reference waveform for the nutrunner 1 is associated with the nutrunner 1 to be stored in the control unit 21. The waveform database 22 is configured to accumulate the tightening waveforms transmitted from the nutrunner 1, and is stored in a recording medium (not shown). The communication unit 23 is provided so that the server device 2 communicates with the nutrunner 1 and the notification device 3. The waveform database 22 is an example of a "database" of the present invention.

The notification device 3 is provided in the vicinity of the nutrunner 1 so as to correspond to the nutrunner 1. For this reason, the notification device 3 is arranged in the same process as the nutrunner 1, and notifies the worker of the quality of the tightening state of the bolt that is tightened with the nutrunner 1. The notification device 3 includes, for example: a control unit 31; a display unit 32; an input unit 33 and a communication unit 34.

The control unit 31 includes a CPU, a ROM and a RAM, and is configured to control the notification device 3. The display unit 32 is configured to display the determination result and the like transmitted from the server device 2. The input unit 33 is, for example, a touch screen that receives an operation by the worker. The communication unit 34 is provided so that the notification device 3 communicates with the server device 2.

—Operation Example of Inspection System—

Next, the operation example of the inspection system 100 according to this embodiment is described with reference to FIGS. 1 to 4. Note that Steps S1 to S10 in FIG. 3 are performed by the control unit 21 of the server device 2 (see FIG. 1) while Steps S11 to S14 in FIG. 3 are performed by the control unit 31 of the notification device 3 (see FIG. 1).

First, in the nutrunner 1 (see FIG. 1), when a bolt is tightened with the nutrunner body 11, the controller 12 generates the tightening waveform of torque and the tightening waveform of the rotation angle. Next, the controller 12 transmits to the server device 2 the tightening waveform of the torque, the tightening waveform of the rotation angle, identification information of the nutrunner 1, the date and time of tightening, and the like.

Figure 3:
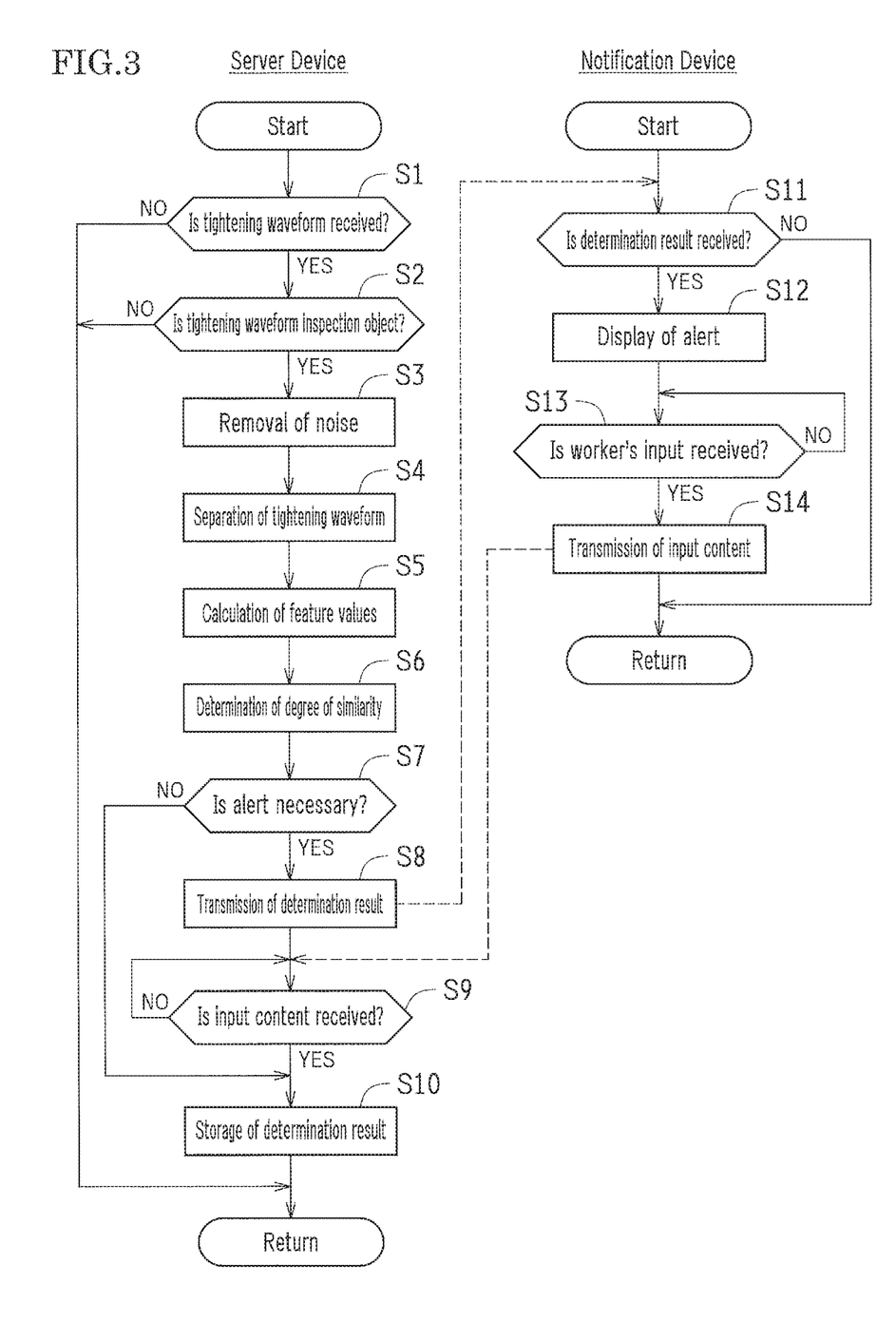
FIG. 3 is a flowchart explaining an operation example of the inspection system in FIG. 1.

Then, in Step S1 in FIG. 3, the server device 2 determines whether the tightening waveforms and the like from the nutrunner 1 are received. When it is determined that the tightening waveforms and the like are received, the procedure advances to Step S2. On the other hand, if it is determined that the tightening waveforms and the like are not received, the procedure returns.

Next, in Step S2, it is determined whether the tightening waveform transmitted from the nutrunner 1 is an inspection object or not based on the information transmitted from the nutrunner 1. For example, in the case in which the identification information of the nutrunner 1 has been registered in the server device 2, when the final torque and the final rotation angle at the time of completion of tightening fall within respective predetermined ranges, it is determined that the tightening waveform is the inspection object. This procedure is performed so as to eliminate the nutrunner and/or the tightening waveform other than the inspection objects. Specifically, when the received identification information is not registered in the server device 2, it means that the tightening is performed using a nutrunner other than the inspection object (for example, a spare tool), thus, it is determined that this case does not correspond to the inspection object. Also, even in the case in which the identification information of the nutrunner 1 has been registered in the server device 2, when the final torque and/or the final rotation angle at the time of completion of tightening do not fall within, respectively, the predetermined ranges, it means obviously that the tightening failure occurs, thus, this case is not determined to correspond to the inspection object of this embodiment and the tightening is re-performed. That is, in this embodiment, the inspection object is a tightening state whose final torque and final rotation angle at the time of completion of tightening fall within the respective predetermined ranges, which is generally determined to be a normal state in the conventional inspection system. And in such inspection objects, a tightening failure (potential failure) is detected. Thus, when it is determined that the tightening waveform transmitted from the nutrunner 1 is the inspection object, the procedure advances to Step S3. On the other hand, when it is determined that the tightening waveform transmitted from the nutrunner 1 is not the inspection object, the procedure returns.

Next, in Step S3, noise is removed from the tightening waveform of the torque. For example, a glitch (spike noise) of the tightening waveform is detected so as to be removed from the tightening waveform. Since the glitch is generated by roughness of the sliding surfaces of the bolt and the workpiece, it is not a feature that should be focused on in this embodiment. Therefore, the glitch is removed.

The tightening manner using the nutrunner 1 is set in which tightening and stop of the tightening are consecutively performed three times for the period from the start of the tightening to the completion of the tightening. In Step S4, the tightening waveform of the torque is separated. Specifically, the tightening waveform is divided into three waveforms constituted of; the waveform from the start to the stop of the first tightening; the waveform from the start to the stop of the second tightening; and the waveform from the start to the stop of the third tightening. Then, the three tightening waveforms are respectively subjected to resampling.

Next, in Step S5, a plurality of feature values are calculated with respect to the similarity between the shape of the reference waveform and the shape of the tightening waveform. In this way, it is possible to quantify the similarity between the shape of the reference waveform and the shape of the tightening waveform. The reference waveform (see FIG. 2) is stored in the control unit 21 in advance. Similarly to the case of the tightening waveform, the reference waveform is also subjected to noise elimination, division of the waveform, and resampling. The plurality of feature values is, for example, the five feature values as listed below from (A) to (E). These feature values are selected under the condition that each feature value has a low correlation with the others. The five feature values are calculated for each of the three divided tightening waveforms.

(A) Standard deviation;
(B) Cross-correlation coefficient;
(C) Quadratic regression coefficient;
(D) Frequency analysis; and
(E) Second-order differential coefficient of difference.

The standard deviation is an index that indicates a total deviation between the tightening waveform and the reference waveform. The cross-correlation coefficient is an index that indicates whether the overall tendency between the tightening waveform and the reference waveform is parallel or orthogonal. The quadratic regression coefficient is an index that indicates whether the tightening waveform and the reference waveform are each an upward convex or a downward convex as a whole, and is a first term coefficient of the quadratic approximation curve. The frequency analysis is an index that indicates the amount of fine uneven parts, which is a ratio of the frequency spectrum of the difference between the tightening waveform and the reference waveform (i.e. low frequency/high frequency). The second-order differential coefficient of the difference is an index for detecting partial winding, which is a maximum value of the absolute value of the second-order differential coefficient of the difference between the tightening waveform and the reference waveform.

Next, in Step SG, the degree of similarity of the shape of the tightening waveform to the shape of the reference waveform is determined based on the five feature values. For example, the determination of the degree of similarity is performed using complex feature values $F_1$ and $F_2$ that are respectively calculated by Expression (1) as stated below using the five feature values. Thus, the five feature values are converted into the two complex feature values $F_1$ and $F_2$, and by plotting these complex feature values $F_1$ and $F_2$ on a scatter diagram, it is possible to geometrically consider and set the determination threshold value. The complex feature value $F_1$ is, for example, an index that indicates the degree of similarity of the overall waveforms. The complex feature value $F_2$ is, for example, an index that indicates the degree of similarity of the waveforms in detail.

[Expression (1)]

$$\begin{bmatrix} F_1 \\ F_2 \end{bmatrix} = \begin{bmatrix} m_1 & m_2 & m_3 & m_4 & m_5 \\ n_1 & n_2 & n_3 & n_4 & n_5 \end{bmatrix} \begin{bmatrix} A \\ B \\ C \\ D \\ E \end{bmatrix} \quad (1)$$

In Expression (1), the feature value of the standard deviation is represented by A, the feature value of the cross-correlation coefficient is represented by B, the feature value of the quadratic regression coefficient is represented by C, the feature value of the frequency analysis is represented by D, and the feature value of the second-order differential coefficient of the difference is represented by E. The coefficients determined by experiments and the like are represented by $m_1$ to $m_5$ and $n_1$ to $n_5$.

In this way, the complex feature values $F_1$ and $F_2$ are plotted on the scatter diagram, and the degree of similarity is determined. In this embodiment, multistage determination results (i.e. degrees of the probability of defect) are output with respect to the degree of similarity.

Figure 4:
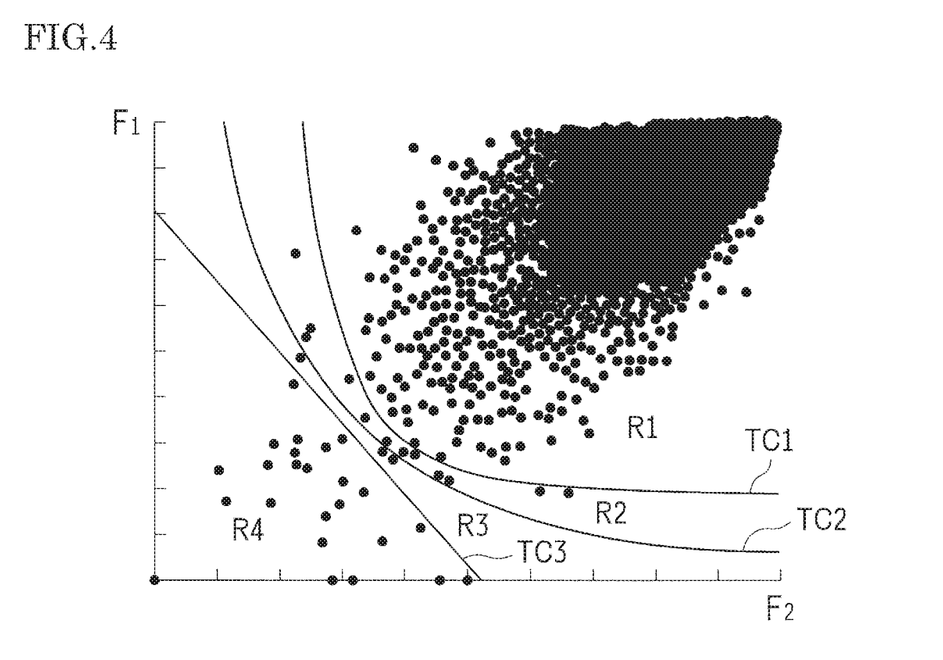
FIG. 4 is a scatter diagram indicating an example in which various inspection objects are plotted in the two-dimensional coordinate that sets a complex feature value $F_1$ as the vertical axis and a complex feature value $F_2$ as the horizontal axis.

Here, FIG. 4 is a scatter diagram indicating an example in which various inspection objects are plotted in the two-dimensional coordinate that sets the complex feature value $F_1$ as the vertical axis and the complex feature value $F_2$ as the horizontal axis. In the scatter diagram, threshold curves TC1 to TC3 are set, and respective regions are defined by the threshold curves TC1 to TC3. A region R1 defined by the threshold curve TC1 has a high degree of similarity and thus is determined to be a normal state (OK). A region R4 defined by the threshold curve TC3 has a low degree of similarity and thus is determined to be a defective state (NOK). The region between the threshold curves TC1 and TC3 is an intermediate region which is further divided by the threshold curve TC2. The region R2 defined by the threshold curves TC1 and TC2 is a region that is determined to have a low probability of defect. The region R3 defined by the threshold curves TC2 and TC3 is a region that is determined to have a high probability of defect. The threshold curves TC1 to TC3 are determined by experiments and the like.

Therefore, when the calculation result (calculated complex feature values $F_1$ and $F_2$) is plotted in the region R1, it is determined that the state is normal. In contrast, when the calculation result is plotted in the region R4, it is determined that the state is defective. Also, when the calculation result is plotted in the region R2, it is determined that the probability of defect is low, and when the calculation result is plotted in the region R3, it is determined that the probability of defect is high. This quality determination is performed for each of the three divided tightening waveforms.

Then, in Step S7, it is determined whether it is necessary to alert the worker. For example, when it is determined that the state is defective in at least one of the three tightening waveforms, it is determined that it is necessary to alert the worker. Also, when it is determined that there is a high probability of defect in at least one of the three tightening waveforms, it is determined that it is necessary to alert the worker. That is, when it is determined that the state is normal or that the probability of defect is low in all the three tightening waveforms, it is determined that it is not necessary to alert the worker. When it is determined that it is necessary to alert the worker, the procedure advances to Step S8. On the other hand, when it is determined that it is not necessary to alert the worker, the procedure advances to Step S10.

In Step S8, the determination result is transmitted to the notification device 3. This determination result is transmitted to the notification device 3 corresponding to the nutrunner 1 that transmits the tightening waveform as the inspection object. Also, the reference waveform and the tightening waveform (defective waveform) are also transmitted to the notification device 3 together with the determination result.

In Step S11, the notification device 3 determines whether the determination result is transmitted from the server device 2. When it is determined that the determination result is transmitted, the procedure advances to Step S12. On the other hand, when it is determined that the determination result is not transmitted, the procedure returns.

Figure 1:
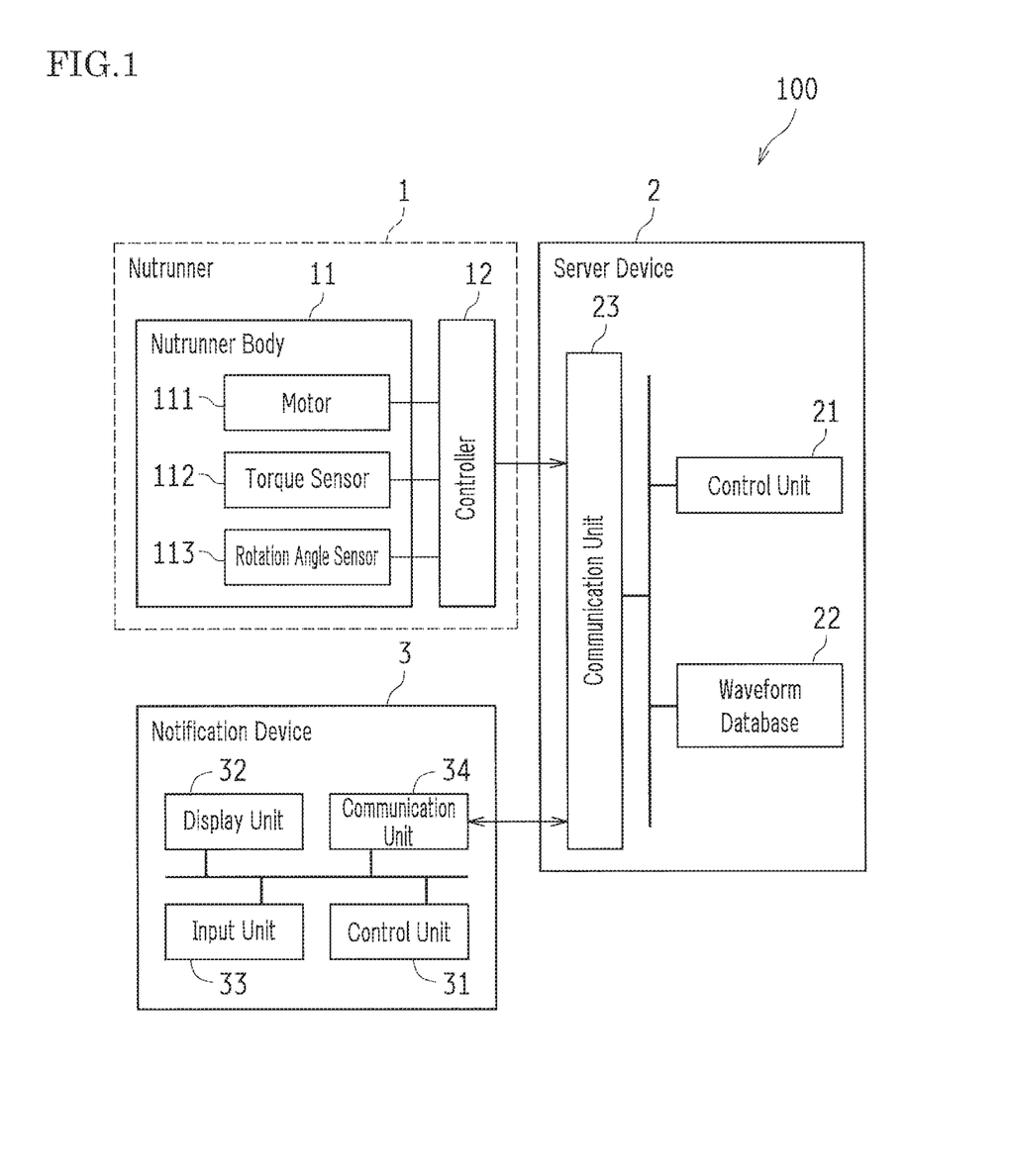
FIG. 1 is a block diagram illustrating a configuration of an inspection system according to an embodiment.
Figure 2:
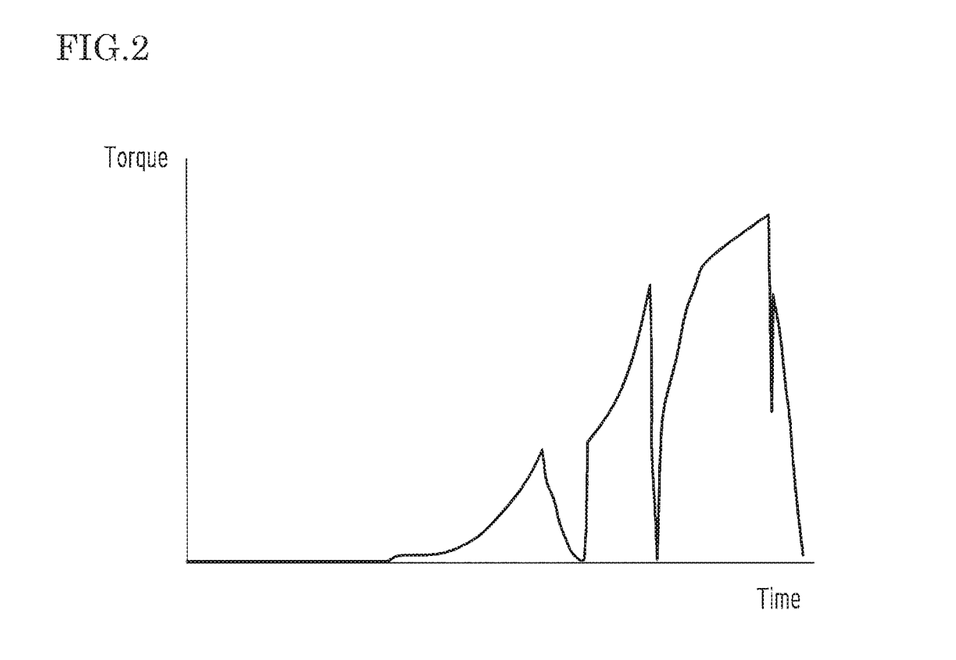
FIG. 2 is a graph indicating an example of a reference waveform stored in a server device of the inspection system in FIG. 1.

In Step S12, an alert is displayed on the display unit 32 (see FIG. 1). The alert may include, for example, the defect degree (determination of the defect and of the high probability of defect), and a display to prompt the worker to take a countermeasure. Also, along with the alert, the reference waveform and the tightening waveform (defective waveform) may be displayed on the display unit 32, so that the worker can visually confirm the tightening waveform.

Then, when the worker unscrews the bolt to confirm the bolt tightening point and finds a tightening failure such as sticking, the worker inputs the fact (i.e. defective tightening state) to the input unit 33 (see FIG. 1). In this case, the bolt is replaced with a new one and the new bolt is tightened. Such a re-tightening is subjected to the inspection by the inspection system 100.

On the other hand, when the worker unscrews the bolt to confirm the bolt tightening point and does not find any tightening failure such as sticking, the worker inputs the fact (i.e. normal tightening state) to the input unit 33. In this case, the bolt is re-tightened. Such a re-tightening is subjected to the inspection by the inspection system 100.

In Step S13, it is determined whether the worker has input the quality determination of the tightening state. When it is determined that the worker has input the quality determination of the tightening state, the procedure advances to Step S14. On the other hand, when it is determined that the worker has not yet input the quality determination of the tightening state, Step S13 is repeatedly performed. That is, the procedure does not advance until the tightening state is input.

In Step S14, the quality determination of the tightening state by the worker is transmitted to the server device 2. Then, the alert on the display unit 32 is deleted, and the procedure returns.

In step S9, the server device 2 determines whether the quality determination of the tightening state by the worker has been transmitted from the notification device 3. When it is determined that the quality determination of the tightening state by the worker has been received, the procedure advances to Step S10. On the other hand, when it is determined that the quality determination of the tightening state by the worker has not yet been received, Step S9 is repeatedly performed. That is, the procedure does not advance until the quality determination of the tightening state is received.

Then, in Step S10, the tightening waveforms are accumulated in the waveform database 22 (see FIG. 1). At this time, the identification information of the nutrunner 1, the date and time of tightening, the determination result and the like are also accumulated in the waveform database 22 in the state in which they are associated with the tightening waveform. For example, when it is determined that the tightening waveform is normal (Step S7: NO), this tightening waveform is accumulated in the waveform database 22 as a normal tightening waveform. When it is determined that the probability of defect of the tightening waveform is low (Step S7: NO), this tightening waveform is accumulated in the waveform database 22 as a tightening waveform having low probability of defect. Also, in the case in which it is determined that the tightening waveform is defective or that the probability of defect of the tightening waveform is high (Step S7: YES), when the worker determines that the tightening state is defective, this tightening waveform is accumulated in the waveform database 22 as a defective tightening waveform. In the case in which it is determined that the tightening waveform is defective or that the probability of defect of the tightening waveform is high (Step S7: YES), when the worker determines that the tightening state is normal, this tightening waveform is accumulated in the waveform database 22 as a normal tightening waveform. That is, when the determination result by the server device 2 is corrected by the worker, this corrected result is accumulated in the waveform database 22, and after that, the procedure returns.

—Method for Calculating Reference Waveform—

Here, the method for calculating the reference waveform that is stored in the server device 2 according to this embodiment is described.

The reference waveform indicates an ideal torque change with time when the bolt is tightened with the nutrunner 1, and is calculated, for example, using clustering. Specifically, the reference waveform is calculated based on a plurality of past tightening waveforms. The past tightening waveforms are, for example, obtained by tightening bolts and workpieces respectively of the same standards in the same tightening manner using the same nutrunner 1. The number of the plurality of tightening waveforms is a predetermined number or more. However, in order to simplify the explanation, the case in which 100 past waveforms (past tightening waveforms) 1 to 100 are used to calculate the reference waveform is exemplarily described here.

First, the degree of similarity $F_{total}$ between the past waveforms 1 and 2 is calculated. Specifically, the degree of similarity $F_{total}$ between the past waveforms 1 and 2 is calculated, for example, by Expression (2) stated below, using the complex feature values $F_1$ and $F_2$ obtained using the past waveforms 1 and 2.

$$F_{total} = k_1 \times F_1 + k_2 \times F_2 \qquad (2).$$

Here, in Expression (2), $k_1$ and $k_2$ are the coefficients determined by experiments and the like.

In the same way, the respective degrees of similarity $F_{total}$ between all the combinations of the past waveforms 1 to 100 are calculated. Hereinafter, parts of the results are exemplarily shown in Table 1 below.

TABLE 1

|  | Past Waveform 1 | Past Waveform 2 | Past Waveform 3 | Past Waveform 4 | Past Waveform 5 | Past Waveform 6 | Past Waveform 7 | ... | Past Waveform 100 |
|---|---|---|---|---|---|---|---|---|---|
| Past Waveform 1 | — | 98 | 88 | 75 | 95 | 51 | 94 | ... | 96 |
| Past Waveform 2 | 98 | — | 91 | 68 | 91 | 53 | 97 | ... | 95 |
| Past Waveform 3 | 88 | 91 | — | 78 | 92 | 50 | 89 | ... | 92 |
| Past Waveform 4 | 75 | 68 | 78 | — | 73 | 59 | 70 | ... | 65 |
| Past Waveform 5 | 95 | 91 | 92 | 73 | — | 47 | 97 | ... | 93 |
| Past Waveform 6 | 51 | 53 | 50 | 59 | 47 | — | 45 | ... | 48 |
| Past Waveform 7 | 94 | 97 | 89 | 70 | 97 | 45 | — | ... | 93 |
| . | . | . | . | . | . | . | . | ... | . |
| . | . | . | . | . | . | . | . | ... | . |
| . | . | . | . | . | . | . | . | ... | . |
| Past Waveform 100 | 96 | 95 | 92 | 65 | 93 | 48 | 93 | ... | — |

Then, according to the degree of similarity $F_{total}$, the past waveforms 1 to 100 are classified into a plurality of groups. For example, as shown in Table 2 below, the past waveforms 1 to 100 are classified into three groups 1 to 3.

TABLE 2

| Group 1 | Group 2 | Group 3 |
|---|---|---|
| Past Waveforms 1, 2, 3, 5, 7, (...), 100 | Past Waveforms 4, (...) | Past Waveforms 6, (...) |

In the specific example shown in Tables 1 and 2, the past waveforms 1, 2, 3, 5, 7, (...), 100 are classified into Group 1 because they have high degrees of similarity $F_{total}$ to each other. The past waveforms 4, (...) are classified into Group 2 because they have high degrees of similarity $F_{total}$ to each other. The past waveforms 6, (...) are classified into Group 3 because they have high degrees of similarity $F_{total}$ to each other. In Table 1, the past waveform 4 that is classified into Group 2 is shown in the row and column of the past waveform 4, while the waveform 6 that is classified into Group 3 is shown in the row and column of past waveform 6.

Then, out of three Groups 1 to 3, Group 1 to which the largest number of past waveforms belong is defined as a normal group, and the average value (average value for every sampling time) of the past waveforms 1, 2, 3, 5, 7, ( . . . ), 100 that belong to Group 1 as the normal group is defined as the reference waveform.

This calculation of the reference waveform may be performed by the server device 2, or may be performed by a computer other than the server device 2 (not shown).

—Waveform Database Capacity Management—

Here, a description will be given on capacity management of the waveform database 22 in the server device 2 according to this embodiment.

The server device 2 is configured to accumulate, in the waveform database 22, the tightening waveforms transmitted from the nutrunner 1 and the determination result of the tightening waveform. Since the majority of the tightening waveforms transmitted from the nutrunner 1 are normal tightening waveforms, the similar tightening waveforms are repeatedly accumulated in the waveform database 22. Therefore, the server device 2 is configured to delete the tightening waveforms that are determined to be normal out of the tightening waveforms accumulated in the waveform database 22. This deletion of the tightening waveforms may be performed when an operation by the worker is received, or may be automatically performed when the predetermined number or more of the tightening waveforms are accumulated.

—Effects—

In this embodiment, the quality of the tightening state of the bolt is determined based on the degree of similarity of the shape of the tightening waveform to the shape of the reference waveform, as described above. Thus, it is possible to prevent detection failure compared to the case in which the quality of the tightening state of the bolt is determined based on the final torque at the time of completion of tightening. Also, since the notification device 3 is provided, it is possible to immediately notify the worker of the determination result by the server device 2. Therefore, it is possible to immediately notify the worker of the determination results of all the bolt tightening points on the production line while preventing detection failure. As a result, when any defective state is detected, the worker can address immediately the defective state, which leads to reduction in distribution of the products including a defectively tightened bolt to the market.

Also in this embodiment, the past waveforms 1 to 100 are classified into Groups 1 to 3 according to the degree of similarity. Out of Groups 1 to 3, Group 1 to which the largest number of past waveforms belong is defined as a normal group, and the average value of the past waveforms that belong to Group 1 as the normal group is defined as the reference waveform. Since the past waveforms of the normal group are highly probable to be the past waveforms of the normal products, it is possible to calculate an accurate reference waveform.

Also in this embodiment, the five feature values are calculated with respect to the similarity between the shape of the reference waveform and the shape of the tightening waveform. Thus, it is possible to quantify the similarity between the shape of the reference waveform and the shape of the tightening waveform so as to perform quality determination. More specifically, since the similarity between the shape of the reference waveform and the shape of the tightening waveform can be quantified as the five feature values, it is possible to perform quality determination using the five feature values.

Also in this embodiment, the two complex feature values $F_1$ and $F_2$ are calculated using the five feature values, thus it is possible to geometrically consider and set the quality determination threshold value.

Also in this embodiment, the tightening waveforms that are determined to be normal are deleted out of the tightening waveforms accumulated in the waveform database 22. Thus, it is possible to prevent increase in the data amount of the tightening waveforms accumulated in the waveform database 22.

Also in this embodiment, the worker can input the determination of the quality of the tightening state of the bolt to the notification device 3. Thus, even when it is determined by the server device 2 that the tightening state is defective or that the probability of defect is high, if the worker confirms the state and determines that it is normal, it is possible to correct the determination result of the server device 2.

Other Embodiments

The above-disclosed embodiments are to be considered in all respects as illustrative and not limiting. The technical scope of the invention is indicated by the appended claims rather than by the foregoing description, and all modifications and changes that come within the meaning and range of equivalency of the claims are intended to be embraced therein.

For example, in the above-described embodiment, the reference waveform may be calculated for each of the plurality of nutrunners 1 that is installed on the production line, or parts of the plurality of nutrunners 1 that is installed on the production line may share the same reference waveform. For example, when the kind of the nutrunner 1 is the same and furthermore when the bolts and the workpieces respectively of the same standards are tightened in the same tightening manner, it is possible to share the reference waveform.

Also in this embodiment, the quality of the tightening state of the bolt may be determined based on the degree of similarity of the shape of the tightening waveform that indicates the rotation angle change with time when the worker tightens the bolt using the nutrunner 1 to the shape of the reference waveform that indicates the ideal rotation angle change with time when the bolt is tightened. That is, the quality of the tightening state of the bolt may be determined based on the degree of similarity of the shape of the tightening waveform to the shape of the reference waveform with respect to the rotation angle of the bolt. With this configuration, it is possible to further prevent the detection failure.

Also in this embodiment, all the bolt tightening point on the production line are subjected to the inspection. However, the present invention is not limited thereto. Parts of the bolt tightening points on the production line may be subjected to the inspection.

Also in this embodiment, the tightening manner is shown in which tightening and stop of the tightening are consecutively performed three times. However, the present invention is not limited thereto. Another tightening manner may be applied in which the tightening is completed, for example, at a time.

Also in this embodiment, the worker is notified of the determination result when the alert is necessary. However, the present invention is not limited thereto. The worker may be notified of the determination result when it is determined that the tightening state is normal.

Also in this embodiment, the server device 2 includes the waveform database 22. However, the present invention is not limited thereto. The waveform database may be a separate body from the server device. Also in this embodiment, the server device 2 determines the quality of the tightening state. However, the present invention is not limited thereto. The notification device may determine the quality of the tightening state.

Also in this embodiment, the input unit 33 is a touch screen. However, the present invention is not limited thereto. The input unit may be a keyboard or a mouse.

Also in this embodiment, the glitch may be removed by any methods. For example, sample points may selectively be removed, where the value obtained by comparing the output of the median filter with the actual data exceeds a predetermined value.

Also in this embodiment, the tightening waveform may be separated by any methods. For example, sharp drop of the tightening waveform may be detected by the differential value of the tightening waveform so as to separate the tightening waveform at the time point of the sharp drop.

Also in this embodiment, the standard deviation, the cross-correlation coefficient, the quadratic regression coefficient, the frequency analysis and the second-order differential coefficient of difference are indicated as the five feature values. However, the present invention is not limited thereto. Any number of the feature values may be applied, and also any feature values other than the above may be used.

Also in this embodiment, the two complex feature values $F_1$ and $F_2$ are calculated using the five feature values. However, the present invention is not limited thereto. One complex feature value may be calculated using the five feature values. Also, the degree of similarity may be directly determined based on the five feature values without calculating any complex feature values.

Also in this embodiment, the multistage determination results are output with respect to the degree of similarity. However, the present invention is not limited thereto. Either of the normal state or the defective state may be output as the determination result.

Also in this embodiment, when it is determined that the tightening state is defective or that the probability of defect is high, the alert is transmitted. However, the present invention is not limited thereto. The alert may be also transmitted when it is determined that the probability of defect is low. That is, the condition for transmitting the alert may be appropriately changed.

Also in this embodiment, a machine learning part may be provided so as to correct at least either of the coefficients $m_1$ to $m_5$ and $n_1$ to $n_5$ or the threshold curves TC1 to TC3, when the determination result by the server device 2 is corrected by the worker. In this case, the machine learning part may correct the coefficients $m_1$ to $m_5$ and $n_1$ to $n_5$ such that the calculation result (i.e. calculated complex feature values $F_1$ and $F_2$) by the server device 2 are close to the region R1 determined to be the normal state. Also, the machine learning part may correct the threshold curves TC1 to TC3 such that the calculation result (i.e. calculated complex feature values $F_1$ and $F_2$) by the server device 2 is likely to be included in the region R1 determined to be the normal state.

Also in this embodiment, when the tightening waveforms determined to be normal are accumulated in the waveform database 22, the reference waveform may be learned using the tightening waveforms determined to be normal. For example, the reference waveform may be calculated based on the tightening waveforms determined to be normal in addition to the past waveforms in the normal group.

Also in this embodiment, the reference waveform is calculated using clustering. However, the present invention is not limited thereto. An ideal past waveform may be used as the reference waveform.

Also in this embodiment, the tightening waveforms determined to be normal are deleted from the waveform database 22. However, the present invention is not limited thereto. The tightening waveforms determined to be normal may be compressed, or may be transferred from the waveform database to an outside recording medium.

Also in this embodiment, the communication between the nutrunner 1 and the server device 2, and the communication between the server device 2 and the notification device 3 may be a cable communication or a radio communication.

Also in this embodiment, the present invention is applied to the inspection system to inspect the tightening state of the bolt. However, the present invention is not limited thereto. The present invention may be applied to an inspection system to inspect the tightening state of a screw other than the bolt.

INDUSTRIAL APPLICABILITY

The present invention is suitably applied to an inspection system to inspect a tightening state of a screw.

REFERENCE SIGNS LIST

1 Nutrunner (tightening tool)
2 Server device (determination device)
3 Notification device
22 Waveform database (database)
100 Inspection system

What is claimed is:
1. An inspection system to inspect a tightening state of a screw, comprising:
   a determination device configured to determine quality of the tightening state of the screw based on a degree of similarity of a shape of a tightening waveform that indicates a torque change with time when a worker tightens the screw using a tightening tool to a shape of a reference waveform that indicates an ideal torque change with time when the screw is tightened; and
   a notification device configured to notify the worker of the quality of the tightening state of the screw, the quality being determined by the determination device,
   wherein
   the reference waveform is calculated based on a plurality of past tightening waveforms,
   the plurality of past tightening waveforms are classified into a plurality of groups based on the degree of similarity, and
   out of the plurality of groups, a group to which the largest number of the past tightening waveforms belong is defined as a normal group so as to define the reference waveform as an average value of the past tightening waveforms that belong to the normal group.
2. The inspection system according to claim 1, wherein the determination device is configured to calculate a plurality of feature values with respect to similarity between the shape of the reference waveform and the shape of the tightening waveform so as to determine the quality of the tightening state of the screw based on the plurality of feature values.

3. An inspection system to inspect a tightening state of a screw, comprising:
   a determination device configured to determine quality of the tightening state of the screw based on a degree of similarity of a shape of a tightening waveform that indicates a torque change with time when a worker tightens the screw using a tightening tool to a shape of a reference waveform that indicates an ideal torque change with time when the screw is tightened; and
   a notification device configured to notify the worker of the quality of the tightening state of the screw, the quality being determined by the determination device, wherein
   the determination device includes a database that accumulates the tightening waveform each time, and
   the determination device is configured to delete, out of the tightening waveforms accumulated in the database, the tightening waveforms that are determined to be normal.

4. The inspection system according to claim 1, wherein the notification device is configured to be receivable of input by the worker with respect to the worker's determination of the quality of the tightening state of the screw.

5. The inspection system according to claim 1, wherein the determination device is configured to determine the quality of the tightening state of the screw based on the degree of similarity of the shape of the tightening waveform that indicates a rotation angle change with time when the worker tightens the screw using the tightening tool to the shape of the reference waveform that indicates an ideal rotation angle change with time when the screw is tightened.

* * * * *